INVENTOR.
WILLIAM J. HILDEBRANDT
BY Jesse A. Holton
ATTORNEY

INVENTOR.
WILLIAM J. HILDEBRANDT
BY Jesse A. Holton
ATTORNEY

INVENTOR.
WILLIAM J. HILDEBRANDT
BY Jesse A. Holton
ATTORNEY

INVENTOR.
WILLIAM J. HILDEBRANDT
BY Jesse A. Holton
ATTORNEY

United States Patent Office 2,902,092
Patented Sept. 1, 1959

2,902,092

PUNCH CODING RECORDS FROM A TYPEWRITER KEYBOARD

William J. Hildebrandt, Farmington, Conn., assignor to Underwood Corporation, New York, N.Y., a corporation of Delaware Application December 29, 1955, Serial No. 556,178

19 Claims. (Cl. 164—113)

This invention relates to apparatus for using the operations of a typewriter to produce both a typed legible record of information in the ordinary way, and a corresponding record of the same information in punched hole code combinations. More particularly the invention makes it possible to use a typewriter with a standard four-bank keyboard, to convert the key operations into representations in a code limited to fewer combinations than the number of keys operated, and to punch the coded representations from key operations with additional automatic punching of "shift" codes when needed. The invention also includes a coding grid or matrix for such apparatus.

The usual four-bank typewriter keyboard, with which virtually all typists are familiar, has about 43 character-producing keys and additional functional keys or controls such as letter-space, carriage-return, and tabulation, making roughly 45 or more character or control elements which are used by the operator in producing a typed legible record of information.

A form of perforated record which has proved very popular in the past in telegraphic communications and which is now being proposed for use in the business machines field, is the punched paper tape using various combinations of holes punched in any of five code positions to represent individual characters or other information. The five-position code is mathematically limited to thirty-one possible combinations of one or more holes, so in the past it has been customary to use two of the code combinations as "Letters" shift and "Figures" shift signals and to thereby effectively double the use of the remaining combinations, their significance in the code depending upon whether they have been last preceded by one or the other "shift" signal. Therefore, it has been customary to provide five-hole code tape punching machines having keyboards with 31 keys, arranged in three banks. Twenty-six of the keys represented the letters of the alphabet if depressed following actuation of the twenty-seventh or "Letters" shift key, and represented numerals, punctuation, and special symbols or signals if depressed following actuation of the twenty-eighth or "Figures" shift key. The three remaining keys represented certain machine functions or controls. This type of machine is well-known for operating a five-hole code tape punch by direct coded connections between punch and keyboard.

Unfortunately, from the standpoint of the usual business office, the keyboard of the three-bank 31-key tape-punching machine is not the same as the four-bank 45-key keyboard used every day for business correspondence and similar typing. Therefore, the operator of a three-bank machine must be specially trained, and typing speed will suffer if an operator is using first one machine and then the other. Also, because the case shift is used to obtain figures, punctuation, etc. on the three-bank machine, this machine cannot be used to type ordinary correspondence, because this regularly requires the use of both capital and lower case alphabetic characters not available on the three-bank machine unless a triple shift action is added and the type bars each carry three type faces.

A principal object of the present invention therefore is to provide a typewriter having a standard four-bank keyboard with normal case-shift and type action, and a punch for producing a five-hole coded record, and connections and controls between the typewriter and the punch so that ordinary operation of the typewriter to produce a legible record will be accompanied by production of a punched coded record including all "shift" punchings required by the code. The "shift" punchings are not consciously keyed by the operator, but are produced automatically from the controls of the machine following normal operation of the usual typewriting keys, using certain "memories" in the control.

A further object is to provide such a typewriter-operated tape punch which may be used without additional or different training by a typist already familiar with the usual four-bank keyboard business typewriter; or which may be used in the same fashion as an ordinary typewriter without operating the punch; or may be used to punch tape without making a typed record.

Another object is to provide a combination typewriter and punch which may be operated by a typist capable of sustaining a higher than average speed of typing; that is, a machine in which the speed or rhythm of the typist will not be slowed down by the punch or by the mechanisms used to set the punching code combinations and to operate the punch.

A special object is to provide a coding arrangement capable of operation at high speeds from a typewriter or similar keyboard, particularly one where undesired repeated coding of the same character cannot follow a sustained depression of the same key. A still further object is to provide a key-operated coding arrangement wherein the depression of a second or even a third key at normal typing intervals while a first key is held in depressed position will result in proper coding of characters in the order of key depression with no false or spurious coding.

Other objects and details of that which is believed to be novel and included in this invention will be clear from the following description and claims, taken with the accompanying drawings in which are illustrated examples of apparatus for punching coded records from actuation of a typewriter keyboard, embodying the present invention and incorporating controls with an improved rapid code setting arrangement, shift condition and code position memories in the control, automatic shift designation, and timing as explained below.

In the drawings, Figures 1A and 1B are similar wiring diagrams showing electrical components in the keyboard and in the keyboard-controlled coding portions of apparatus according to a preferred form of the invention, Figure 1A including all keyed elements not requiring a "Figures" condition indication, and Figure 1B including all such elements which do require a "Figures" indication;

THE APPARATUS GENERALLY

Figures 1A, 7:
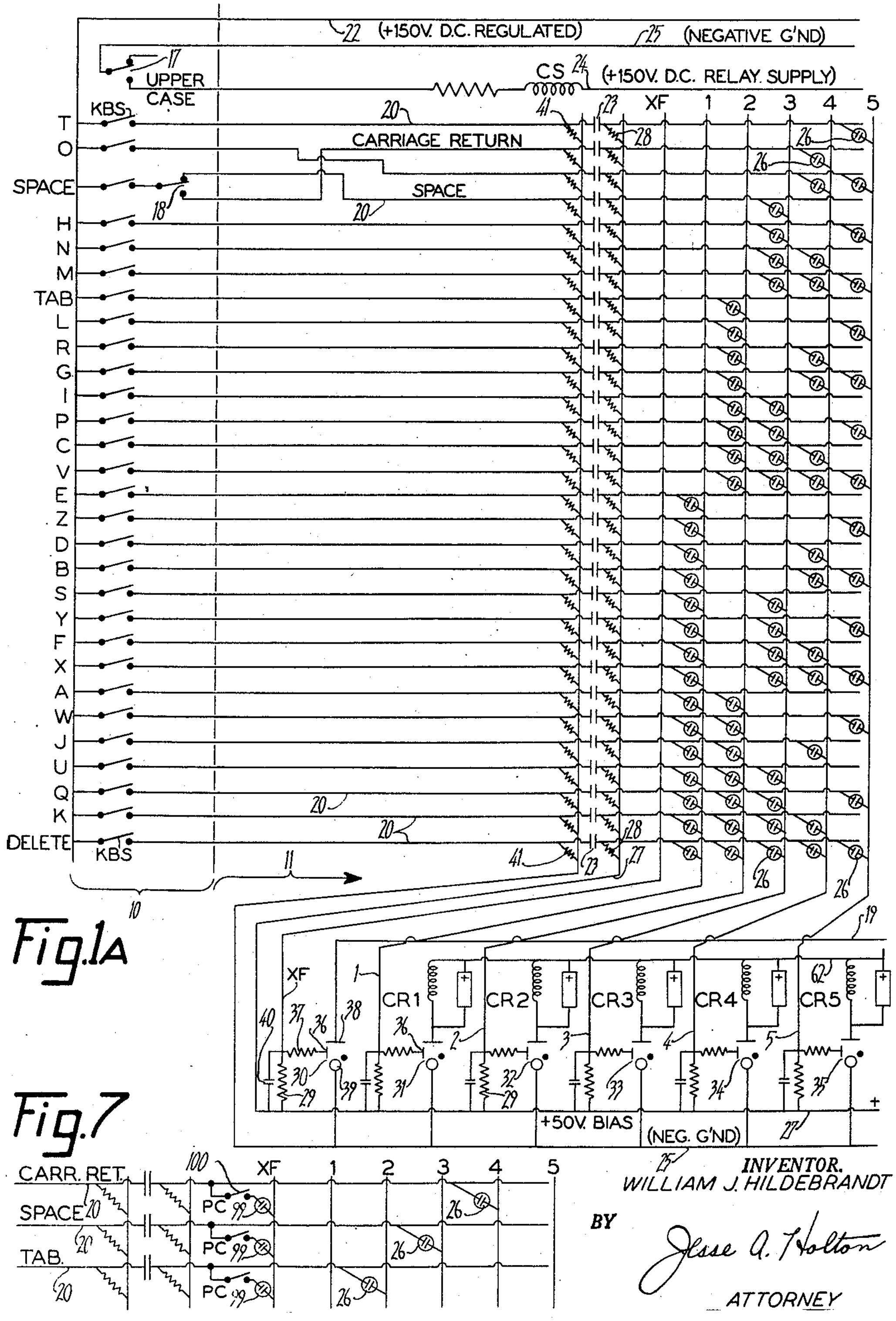
Figure 7 is a wiring diagram of a portion of the coding and control unit showing an alternative arrangement for obtaining certain selected code punchings without a "shift" punching.

According to this invention, a standard typewriter is provided with key operated individual controls momentarily setting up both a basic code combination and a "shift" indication in a control unit, upon each key operation. Means is provided in the control unit to compare the indicated "shift" condition of each key set combination with the "shift" condition of the immediately preceding key set combination, and if the two "shift" conditions agree, the basic code setting is transferred from the control unit to the punch, and the punch is operated while wiping out the basic code setting, although the last "shift" condition is retained for comparison in the succeeding key operation. If the "shift" conditions of succeeding character codes disagree when compared in the control unit, the appropriate shift code setting is first automatically selected and applied to the punch, and the punch is operated to punch the selected shift code while the basic code setting is retained without being used; and the punch then operates a second time with the basic code setting transferred to the punch, the basic setting thereupon being wiped out while its shift condition indication is retained.

It will be seen that two information retaining portions or "memories" are used in the control; first, the momentarily set key-operated means which selects the proper basic code combination and holds it until used by the punch, and; second, the "shift" condition indicator which is compared with the previous shift condition, is used to cause a shift punching when required, and is carried over or held for comparison in the next keyed operation.

A quick setting "memory" for the code combinations including a coding matrix or grid with non-linear resistance elements, insures that false coding will not be obtained, even from overlong deperession of a single key or from overlapping operation of several keys. The "shift" condition indicator portion of the memory is changed or retained by action following the start of the punch and controlled by the punch. Automatic selection of the proper "shift" code, when required, depends upon the direction of change of the shift condition, and the comparison and necessary response, if any, is timed to precede the start of the punch.

Timing, including necessary delays in operation of various parts, is a series of self-sequencing and selecting operations of a predetermined chain-reaction nature so that key operation of the typewriter is followed necessarily by certain control operations, in turn followed by actuation of the punch. The keying, controlling and punching phases are arranged so that they may partially overlap each other without interference. This means that a key operation may be taking place while the punch is finishing its operation from a previous key operation, and therefore the speed of a typist may be sustained at a high rate, because no pause to wait for completion of the punch cycle is necessary. Furthermore, a type of punch is selected which will operate at a continuous speed well above the average speed of a highly trained typist.

One form of the invention which has been found satisfactory is built from an electrically powered four-bank keyboard typewriter unit 10 of a standard construction, a five-hole code tape punch unit 12 also of a standard construction, and a control unit or chassis 11 between the typewriter and punch for coding the keyboard operations and timing and otherwise controlling the operations of the punch as required. These three basic units may be located in any desirable places with relation to one another, but are preferably connected by a multiple wire cable 13 between the typewriter and control unit, and a multiple wire cable 14 between the control unit and punch.

Figure 3:
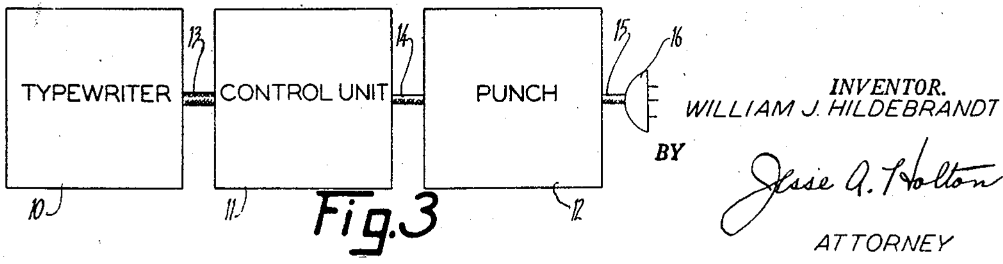
Figure 3 is a block diagram indicating the physical relationship between a typewriter, control unit and punch according to the invention.

One arrangement which has been used is to mount the typewriter on the central portion of the top of a typewriter desk, with the punch unit mounted at one side near the edge of the desk top and the control unit inside of one of the drawers of the desk. Power to operate the apparatus may be obtained through another cable 15, attached to a plug 16, as indicated in Figure 3.

Throughout the specification various electromagnetic relays or similar components will be referred to. The wiring diagrams, for clarity in following the circuits, do not show the coils of these relays next to the contacts which are operated by the coils. Therefore, and to indicate the true mechanical relationship between each relay coil and the contacts which are operated by that coil, a system of nomenclature is used here in which each coil is given an alphabetic reference character and every contact or switch operated by that coil is given the same alphabetic reference character. For example, the case shift relay CS (Figure 1B) controls twelve single-pole double throw switch contacts, also marked CS, located in the input lines to the matrix. All relay contacts, switches and other controls are shown in the drawings in the positions they will occupy when the apparatus is at rest, with no power applied.

This description will cover, in that order, the Typewriter and its Keyboard, the Code and the Punch, the Control Unit and Encoding Matrix, the Power Supply, and then the Operation of the complete apparatus.

*The typewriter, and its keyboard*

Because one of the objects of this invention is to provide a machine through which a typist of ordinary training and skill may produce a printed record and a punched record by operation of a familiar machine, the typewriter 10 used in the example is of a standard four-bank keyboard design, preferably of the electric power driven type. This machine is modified only to the extent necessary for sending signals or settings to and through the control unit for operation of the punch.

For this purpose, each key, bar, or lever on the typewriter, the actuation of which must result in a signal to or control of the punch, is provided with a single pole single throw keyboard switch KBS, normally open, but closed by movement of the key lever or by movement of some element in the linkage operated by the key. When a key is not being operated, its KBS switch is open, as shown in the drawings. In addition, an upper case or case shift switch 17 is provided, which is normally open, but is closed by operation of the usual case shift key. The case shift lock key will hold this switch closed, if desired. A single pole double throw carriage return transfer switch 18 is operated by depression of the carriage return key or keys, and this switch is in series with a "Space" KBS switch, which is also operated by the carriage return key as shown here because in the design of typewriter used, depression of the carriage return key is always accompanied by operation of the letter space mechanism. The "Space" switch is closed also by actuation of the usual space bar alone, without operating the switch 18.

These switches, and their wire leads or connections to proper switch power and signal circuits, are the only necessary additions to the typewriter. This is indicated by their location on the left side of the vertical broken lines in Figures 1A and 1B. Elements to the right of the broken lines are located in the control unit 11, and the wires in cable 13 connecting these units may pass through a multiple terminal socket on the typewriter, to a matching plug at the end of cable 13 leading to the control unit. Power for the typewriter action may also be obtained through this cable connection from the control unit, or by direct separate cable connection of the typewriter to a suitable power source outlet in the usual way.

Actuation of the typewriter keys will result in typing of information in the customary manner, and will also, through operation of the keyboard switches mentioned above, close circuits to send signals to the control unit, which in turn converts the signals into code settings which are used to operate the punch as later explained. The exemplary typewriter in this specification has a four-bank keyboard, including normal and upper case. The character keys can operate usual type bars. Besides the usual seven letter keys in the first or lowest keyboard bank there are eighth and ninth keys for the comma (,) and for the period (.) which type and code the same in normal and in upper case condition of the typewriter; and a tenth key for the diagonal or slash (/) which prints and codes this character normally but which prints nothing in upper case position. This key, when depressed during an upper case condition of the typewriter, will close circuits to set up the coding mechanisms which actuate a "Skip" code combination in the punch. This punched code in the tape is used to control certain functions of machines later working with the punched information. Other similar function codes are also made by the punch from keys such as those for "Clear" and "Eject."

The second bank has the usual nine letter keys; a tenth key which will type and code a semicolon (;) normally but which is non-printing and "Clear" code setting in upper case condition; and an eleventh key which actuates no type action but merely closes a circuit to set up a "Delete" code in the punch when the machine is in either normal or upper case condition. This code uses all five punched holes and is the same as the "Letters Shift" code.

The third bank has merely the usual ten letter keys for that row. The fourth or top bank is best explained by the following chart which lists in one column the characters typed and coded in normal operation of the keys, and in other columns the items typed and coded in upper case condition:

| Normal Case Key | Upper Case | |
|---|---|---|
| | Typed | Coded |
| 1 (one) | - | - (hyphen) |
| 2 | " | " |
| 3 | (not used) | |
| 4 | $ | $ |
| 5 | (not used) | |
| 6 | (nothing) | "Eject" |
| 7 | & | & |
| 8 | ' | ' |
| 9 | ( | ( |
| 0 (zero) | ) | ) |

The keyboard also has its usual space bar, tabulating bar, backspacing key, tabulating and margin controls, case-shift and lock keys, and carriage return keys. Some or all of these keys may be arranged to close a switch KBS and send a punching code to the punch as mentioned above, in addition to carrying out their recognized functions in the operation of the typewriter.

*The code and the punch*

One satisfactory assignment of code combinations, which correspond to that used in the present disclosure, is shown in the chart below. This is a modification of the Baudot five-position code, used for many years in the automatic telegraphy art, and having thirty-one possible punching combinations:

| Meaning, in "Letters" Shift | Code Positions | | | | | Meaning, in "Figures" Shift |
|---|---|---|---|---|---|---|
| | 1 | 2 | 3 | 4 | 5 | |
| A | o | o | | | | - (hyphen). |
| B | o | | | o | o | Skip. |
| C | | o | o | o | | Clear. |
| D | o | | | o | | $. |
| E | o | | | | | 3. |
| F | o | | o | o | | Eject. |
| G | | o | | o | o | &. |
| H | | | o | | o | (not used). |
| I | | o | o | | | 8. |
| J | o | o | | o | | '. |
| K | o | o | o | o | | (. |
| L | | o | | | o | ). |
| M | | | o | o | o | .. |
| N | | | o | o | | ,. |
| O | | | | o | o | 9. |
| P | | o | o | | o | 0 (zero). |
| Q | o | o | o | | o | 1 (one). |
| R | | o | | o | | 4. |
| S | o | | o | | | (not used). |
| T | | | | | o | 5. |
| U | o | o | o | | | 7. |
| V | | o | o | o | o | ;. |
| W | o | o | | | o | 2. |
| X | o | | o | o | o | /. |
| Y | o | | o | | o | 6. |
| Z | o | | | | o | ". |
| Carriage Return | | | | o | | (not used). |
| Tabulate | | o | | | | (not used). |
| Space | | | o | | | Space. |
| Figures Shift | o | o | | o | o | Figures Shift. |
| Letters Shift (Delete) | o | o | o | o | o | Letters Shift (Delete). |

It will be noted that the carriage Return and Tabulate codes have significance only when the punched sequence indicates a "Letters Shift" condition, while the Space code has the same meaning in either "Letters" or "Figures" shift. Arrangements can be used to make all of these codes "shiftless," like the Space code, as will be later described.

The Figures Shift and Letters Shift (or Delete) codes of course have the same meaning at all times because these control the shifting needed for double use of the twenty-nine other punching combinations in the five-position code. When no code punchings are made, but the tape feeding hole alone is punched, this blank code section merely acts as a tape stepping section, and is used at the beginning and ending of a tape or to separate messages on a tape. Tape feed with no code punching is usually controlled on the punch itself.

One punch found useful in this invention is a commercially available device which will punch holes in the coded combinations transversely at spaced points along an elongated tape or strip of paper. Some punches are also designed to punch the code holes near the edge of one or more of a series of record cards, and such devices are intended to be included in this description. Regularly spaced feed holes for the tape or cards are punched before or during the punching of the coded record, so that the machine may hold the record during punching and move it through the machine between punching operations by proper engagement of a toothed wheel or other driving mechanism with the feed holes.

The exemplary punch with which the present invention is shown uses five possible transverse code hole positions, as explained above each of which has its individual plunger to punch one hole. When the punch is connected to a power source, a driving motor starts to rotate a driving shaft, but the punching mechanisms and feeding mechanisms for the tape are not driven until a start magnet SM on the punch is momentarily energized. When SM is energized, a cam shaft on the punch becomes clutched to the driving shaft and this cam shaft is then driven for one revolution only, called a "cycle," and then comes to rest at its starting position as long as the start magnet is not again energized. If the magnet SM continues to be energized or is again energized when the cam shaft reaches its starting position after one revolution, the clutched engagement with the driving shaft will be continued and the mechanism will go through repeated cycles until the magnet is deenergized just before the end of some cycle. Each cycle or revolution of the clutched cam shaft takes 50 milliseconds in the punch used as an example, so that the machine is capable of punching at the rate of twenty code combinations per second when running continuously, there being one code punching possible in each cycle.

At or before the beginning of a cam shaft cycle of the punch, five code magnets, designated CM1 through CM5 here, are energized in any selected combination. The energized magnets are mechanically held in their operated or set condition and hold selected hole plungers until a punching mechanism, driven by the rotating cam shaft, operates the set plungers corresponding to the set plungers corresponding to the set magnets, and then withdraws and restores the plungers if the set code magnets are released. This occurs in the first part of a cycle in the machine of the example, and during the past part of a cycle the cam shaft drives other mechanisms to feed the tape one step and hold it ready for punching in a succeeding cycle. Other kinds of punches are available which may feed the tape during the first part of a cycle and punch it near the end of a cycle. Either type may be used, with appropriate timing to be sure that the code magnets are properly set and released and that the start magnet or its equivalent governing the punching and feeding is controlled in a timely fashion. Punches with faster cycling times might also be used with attendant advantages.

The cam shaft of the punch is also used in the present embodiment of the invention to time the operation of certain conditions in the control unit with relation to the punch cycle, and for this purpose cams S1, S2A, S2B, S3A and S3B are provided on the punch cam shaft. These cams operate corresponding switches at various times during each punch cycle, in a manner and for purposes later described.

Figure 4:
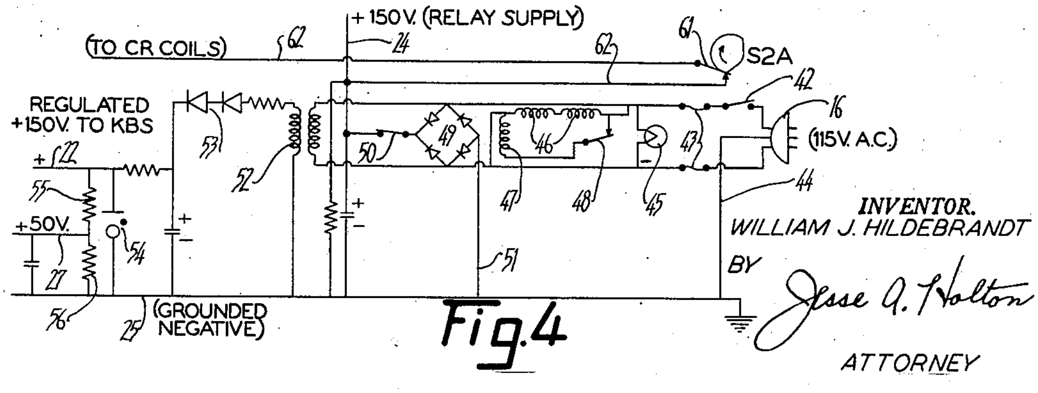
Figure 4 is a wiring diagram showing one arrangement for obtaining desired electrical power for operating the various parts of the apparatus.

The cable connection 14 which may be of the plug-in variety, extending between the punch and the control unit, carries wires from the CM magnets, the SM magnet, from the switches controlled by cams S1, S2A, S2B, S3A and S3B, and power lines to the control unit. The punch may receive its power from a 115 v. A.C. supply, with ground, through the plug 16 and cable 15. Figure 4 indicates diagrammatically how power for the various parts of the assembly may be obtained from this supply.

*The control unit, and its encoding matrix*

The control unit has a chassis (not shown) carrying a coding matrix or grid having input lines 20 coming directly from KBS switches and switch 18 of the typewriter keyboard, and other input lines 21 coming from the KBS switches through CS relay contacts. The CS contacts are operated by case shift relay coil CS in the control unit. This relay CS is energized by closing of case shift switch 17 on the typewriter when the case shift key is depressed by the typist. The coded significance of each matrix input line is shown in the drawings either opposite each keyboard switch or next to the matrix itself.

There are six output lines from the code grid, marked XF, and 1, 2, 3, 4 and 5. The XF output line operates the figures code relay F, over a line 19 as will be later explained, and the numbered code matrix outputs operate code relays CR1, CR2, CR3, CR4 and CR5, respectively. A signal closing the relay F indicates that the keyed character is to be given its "Figures Shift" code meaning. Signals closing the CR relays denote the basic five-hole code positions for the character typed, apart from the shift condition.

Figure 2:
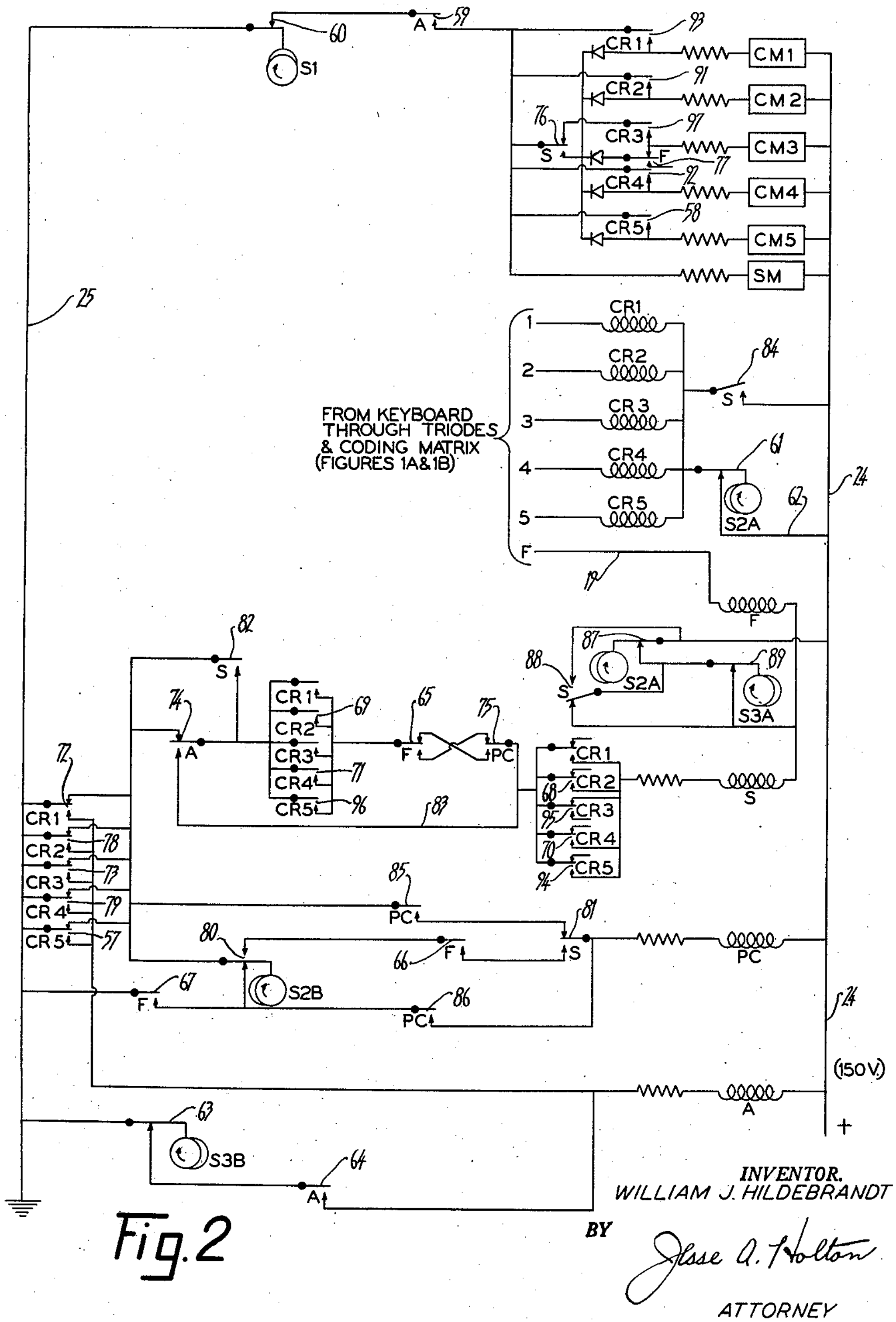
Figure 2 is a simplified wiring diagram of the entire apparatus, omitting details of the keyboard and coding components shown in Figures 1A and 1B.

Every operation of the control unit and therefore of the punch, depends upon some initial combinational operation of the F, CR1, CR2, CR3, CR4 and CR5 relays from the typewriter keyboard. As seen in Figure 2, another relay S, which is the shift code signal and setting device, may or may not be actuated with the F relay, depending upon the shift condition indication of the previous character typed, which is shown by the setting of the previous character relay PC.

Relay PC has its coil located in a circuit which is closed by contacts operated by the F and S relays every time that these relays are actuated together, but only after the punch has started to punch the required shift code determined by S. Thereafter, during each succeeding punch cycle, the condition of the PC relay is tested, but its circuit is held closed by one of its own contacts if the F relay is also operated during that cycle, indicating a continued "Figures" shift condition. When the F relay is not operated, but the PC relay is operated, this indicates a "Letters" shift condition, and the shift relay S will operate to set the other proper shift code. As the PC circuit is tested in the consequent punch cycle, the unoperated F relay and the operated S relay will have broken the possible holding paths for the PC relay coil, and the PC relay will be released and stay released until the next following F signal, which will be combined with the shift indication of relay S to again operate the PC relay.

Controlling all these operations is a main governing device shown here in the form of a relay A, having a controlling contact in the circuit for the S relay coil, and for general punch control purposes, having a controlling contact in the circuits for the start magnet SM and the code magnets CM in the punch.

The A relay is in turn controlled by code information retaining devices such as the five code relays CR, key-energized through the matrix. However, the A relay contacts do not close immediately when a CR contact is closed, but a built-in delay in operation is provided, to give the apparatus time to determine whether or not a "shift" code punching will be required before the code setting is punched.

Before the A relay contacts close, the S and F relays will have previously set up or conditioned the code magnets CM to be ready to punch a proper "shift" code if that is required, and when the A contacts do close, one of them supplies power to the CM magnets and to the SM magnet to start the punch and to punch the proper "shift" code, regardless of the setting of the code relay contacts CR. As the punch cycles to punch the "shift" code, the cam switches on the punch first deenergize the code magnets CM and start magnet SM, then set or release the previous character relay PC as required, and then release the S relay, and the F relay if it has been operated. Note that in a non-shift cycle the code relay CR settings would ordinarily be wiped out during a punch cycle, but because the S relay was operated, indicating a "shift" punching, the CR relay coil circuits will be held closed by an S contact during the usual part of the punch cycle when the CR coil circuits might have been opened. This means that the CR settings are retained through a "shift" punching, and because the A relay is controlled by CR contacts, the A relay remains operated. Therefore, as soon as the punch nears the end of its first or "shift" punching cycle, the cam switch S1 will this time, through the closed A contact, close the coil circuits of code magnets CM corresponding to the key-set and matrix-coded relays CR, and the SM coil circuit energization will allow the punch to enter its second cycle and punch the key-set code.

If no shift code is required, the S relay will not have been operated, and when the delayed closing of the A relay contact takes place this will start the punch through magnet SM and energize the code magnets CM in accordance with the key setting of the code relays CR. As the punch cycle progresses, the cam switches first wipe out the code and start magnet settings CM and SM, the code relay CR settings and the F relay setting if any, and then the A relay setting. Since no CR relays are then operated, the A relay will not hold on, and near the end of the punch cycle the cam switch S1 will close again without energizing the start magnet SM, the A contact being open. The punch will then stop.

In the drawings, various rectifiers, resistances and arc suppressors are shown, but these are not always referred to in this description because they merely perform recognized functions in the D.C. circuits to improve the action, prevent back-tracking of circuits, reduce switch contact arcing, and so forth. Such devices may of course be added or eliminated as desired or required and many actually used have been left out of the diagram of Figure 2, to clarify the general scheme of things.

*Encoding matrix*

Because all of the operations of the control unit and punch depend upon accurate, rapid, non-repetitive coding the the keyboard switch operations in the typewriter, the character of the coding matrix and its association with the "memory" portions of the rest of the controls is of the utmost importance. Although other coding arrangemens having similar characteristics might be used in the general scheme of the present invention, the particular matrix or grid described here has been found to be especially well suited for application in the present invention. Obviously, however, this type of construction may have other uses apart from the one shown and described here.

Figure 1B:
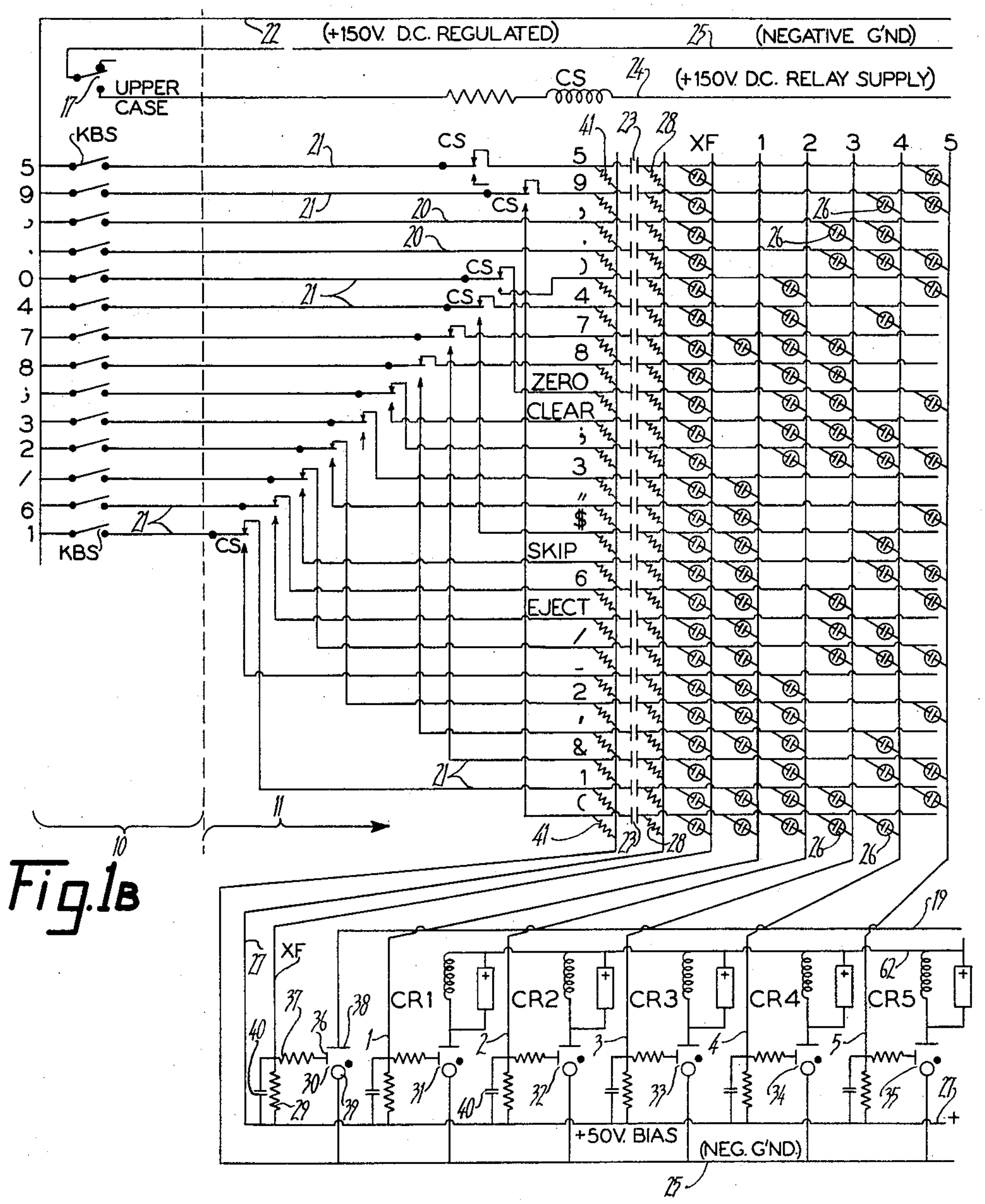

As shown in Figures 1A and 1B and mentioned above, the matrix has many input lines 20 and 21 and only six output lines XF, 1, 2, 3, 4 and 5. The effective connection of an input line to one or more of the output lines will determine the code which is set up by operation of the key or keys controlling the input line.

Each of the keyboard switches KBS receives power over a common positive 150 volt D.C. regulated supply 22, which may be obtained as indicated diagrammatically in Figure 4. From the switches, each input line 20 goes directly to the matrix through an input pulse forming element such as a capacitor 23, for reasons later described. The branch for the Space key switch also goes through the Carriage Return switch 18 as above explained, and from that switch it proceeds to two matrix inputs 20, each with its capacitor 23. One input is connected to code Space when the space bar alone is operated to close its KBS switch, the switch 18 not being operated. The other input is connected to code Carriage Return when the carriage return key operates its switch 18 and at the same time closes the Space KBS switch.

From other switches KBS, which must send different codes depending upon the case shift condition of the typewriter, the input lines 21 lead to case shift relay contacts CS which connect to different coding lines through capacitors 23 on the matrix depending upon whether or not the case shift relay CS has been operated by closing of switch 17 upon depression of a case shift key on the keyboard. The coil of relay CS gets its power from a positive 150 volt D.C. relay supply 24, like the rest of the relays. The other side of this and other relay coil circuits goes to a grounded negative wire 25.

On the other side of each capacitor 23 in the matrix, the input lines 20 and 21 cross over the output lines XF, 1, 2, 3, 4 and 5 but are not connected thereto excepting at those points required for the particular code associated with the input. Comparison of Figures 1A and 1B with the punch code table given previously will show that the XF output line is associated with each input line having a significance only in "Figures" shift condition of the code, and that all other input lines lack a connection to the XF output. The output lines 1, 2, 3, 4 and 5 have of course the same significance as the corresponding code hole positions in the punch code, and the various combinations set up in the matrix will operate corresponding combinations of the code relays CR1, 2, 3, 4 and 5.

To prevent back-connection or cross-talk, and consequent spurious coding, the code-arranged crossover connections between the input and output lines might theoretically be made by one-way elements such as rectifiers, at the desired junctions. However, practical considerations including voltage requirements, speed of action, cost, etc. led to the consideration of a non-linear resistance connection or threshold device for the function element. Small neon tubes (diodes) 26 were found to be excellent for the purpose of preventing back-connection and spurious coding, as well as being quick-acting.

The neon tube may be regarded as a non-linear resistive element with symmetrical but discontinuous characteristics. In practical effect, this means that although a given voltage is required to fire the tube, a lower voltage is sufficient to sustain the tube once it has been fired. During the turning on or initial firing of the tube, as the current increases, voltage decreases. With a controlled input, and knowing the characteristics of the tube being used, sufficient voltage can be applied to fire the tube, and then the excess over the sustaining voltage is calculated to be enough to send a sufficient setting signal to the proper code output line, but not enough to cause firing of back-connected tubes in the matrix to an extent resulting in a sufficient setting signal to an improper output line. For example, neon lamps have been used which fire at about 80 volts, but require only about 60 volts sustaining force. The excess 20 volts after firing, is used to help set a quick operating "memory" device which will not require continuance of the set signal voltage in order to maintain itself once it is started.

The "memory" may be called a signal storage device, and it is preferably set by a pulse to "lock in" or establish a signal circuit separate from the setting circuit. One such pulse settable circuit making signal receiver or "memory," which also has useful power amplification, is a gas-filled triode, like the six triodes, 30, 31, 32, 33, 34 and 35 used here, one each of the matrix output lines XF, 1, 2, 3, 4 and 5 respectively. Each of the triodes has a starter anode 36, connected to one of the matrix output lines through a series protective resistance 37, a main anode 38 leading to the code relay coil associated with the triode and then to the positive 150 volt D.C. relay supply line 24, and a cathode 39 connected to the grounded negative 25.

When a sufficient starting voltage, in this instance 105 volts, is impressed on the starting anode 36, that particular triode will start to fire, if the relay coil circuit from the anode is previously closed to a power course, establishing a circuit from grounded negative 25, cathode 39, main anode 38, through the appropriate relay coil, to the relay supply 24. This circuit will be maintained after the starting voltage pulse is withdrawn from anode 36, and will be continued until power through the relay coil is interrupted from supply line 24. It can be established again only after the supply line circuit is closed, and starting voltage is thereafter imposed on the starter anode 36.

To provide sufficient starting voltage, a 50 volt bias 27 is used, and this bias is also connected to each matrix input line through a load resistor 28 for the capacitor network, as well as to each starter anode and its matrix output line through a load resistance 29 for the matrix.

A capacitor 40 is in series between the bias 27 and each matrix output line, and this is used in smoothing out signals to the starting anode, integrating any rough spots due to contact bounce, random circuit noise, etc.

As indicated above, and as may be seen in Figures 1A and B, the 50 volt bias is applied to both sides of the neon tubes in the matrix, as well as to the starting anodes of the triodes. The devices are therefore close to their firing or threshold voltages when the key switches are closed, and it will take only a few microseconds for the neon tubes and triodes to act. In the example shown, the triodes are somewhat faster acting than the neon tubes, which adds a safety factor.

When a switch KBS is closed, the regulated positive 150 volts on line 22 is connected to an input line 20 or 21, and capacitor 23 becomes charged and passes a pulse sufficient to fire the neon tube or tubes 26 connected to that input and to certain outputs. As the neon tubes are fired, the triodes connected to the outputs are triggered or fired by their anodes 36. Because the capacitor 23 is now charged, the voltage difference across the neon tubes quickly drops to below the sustaining level for the tubes and they cease to fire. The voltage on the triode starter anodes 36 drops to the original 50 volt bias. The capacitor 23 by its charge storing and releasing action, as will be readily understood, has given a quick-acting or momentary pulse setting of the F and CR relays, which will not be repeated even though switches KBS might be directly closed by typewriter key levers and a particular key is held down by an operator. The switch-connected side of each input line capacitor is connected to the negative ground 25 through a load resistance 41 for the switch. This also supplies a discharge path for the capacitors.

*Power supply*

Figure 4 shows one way in which the various D.C. supplies may be obtained through the usual 115 volts A.C. plug 16, with which the punch 12 comes equipped. One side of the A.C. supply has a punch control switch 42 therein, and the A.C. lines may have the usual fuses 43 or circuit breakers. The plug 16 also has a grounding terminal with a lead 44 connected to the negative ground 25. A pilot or indicating lamp 45 may be used to show when the punch circuit is closed.

The punch driving motor has running windings 46, a starter winding 47, and a starter switch 48, all arranged and operated in customary fashion.

However, in the punch power circuit a full wave D.C. rectifier 49 is provided, and this may have a safety switch 50 leading to the line 24, which is the positive 150 volt D.C. supply for the relay circuits. A negative connection 51 is also made to the ground wire 25. Appropriate protective or corrective elements such as resistors, capacitors, etc. are used in customary fashion when required or as desired.

A regulated voltage A.C.—D.C. transformer including customary windings 52, rectifiers 53, gas-filled diode 54, and resistances 55 and 56, provides the regulated positive 150 volts D.C. supply 22 for the keyboard switches KBS, and the positive 50 volts bias 27 for the neon tube matrix and coding triodes. Again, protective and corrective elements may be used.

Details of the power supply connections for the typewriter itself are not given, since these may be conventional, or obtained at appropriate points from the power supply circuits shown in Figure 4.

*Operations*

Figures 5, 6:
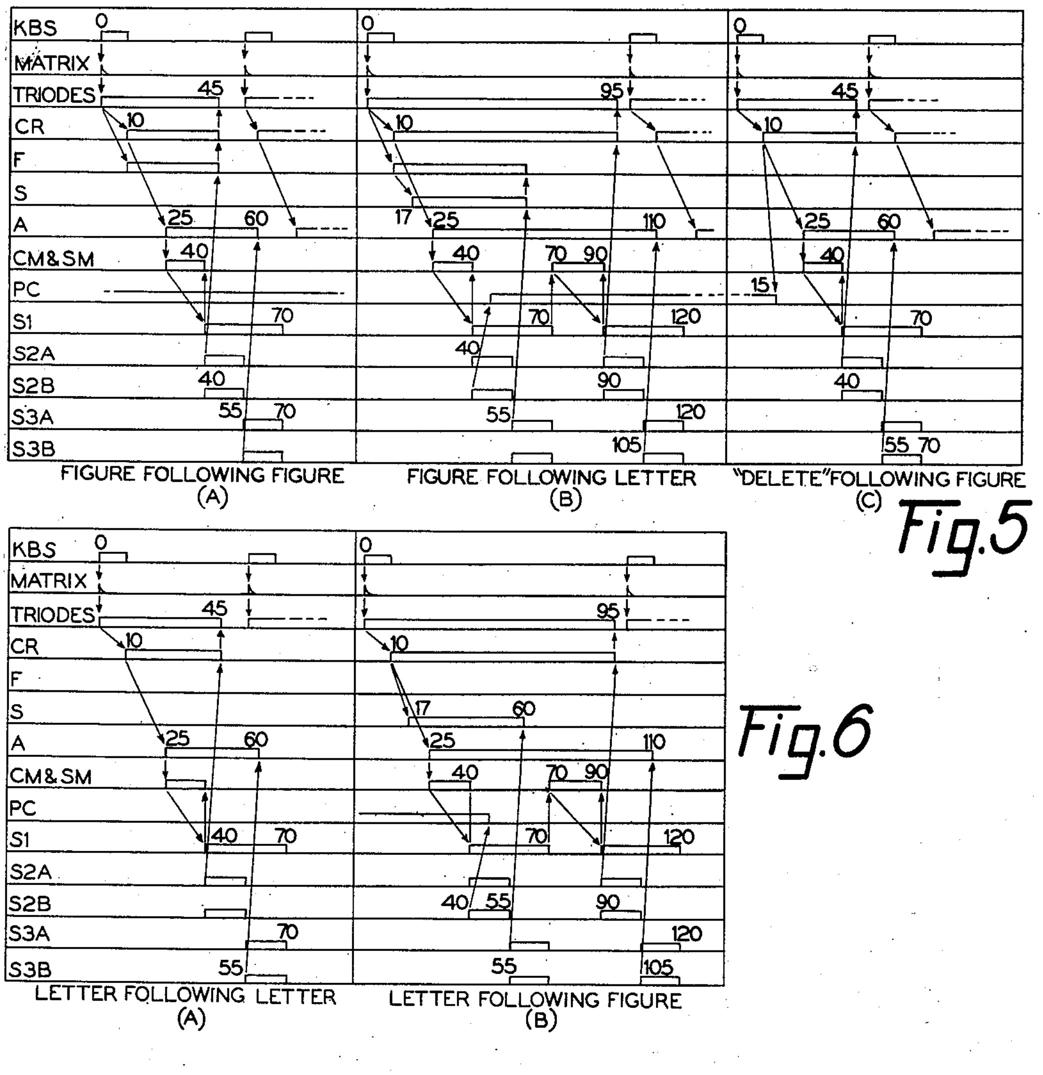
Figure 5 is a timing chart showing cycles of the apparatus when keying and punching (*a*) a Figure following a Figure (*b*) a Figure following a Letter, and (*c*) "Delete" following a Figure.
Figure 6 is a similar timing chart showing cycles when keying and punching (*a*) a Letter following a Letter, and (*b*) a Letter following a Figure.

*Starting, or typing and punching a letter following a letter.*—Referring to section (*a*) of Figure 6, power will be applied to all appropriate sources as explained above, and the punch motor will be running although the punch cam shaft will not be clutched or turning. None of the relays will be operated before depression of some key. Assume that a letter key is depressed, for example, the one for "T." The KBS switch for "T" will be closed by the key or by some part of the type action motivated by the "T" key. Almost instantaneously the capacitor 23 in the input line will pass a pulse, firing the neon tube 26 which is connected to the output line 5 of the matrix. Triode 35 will fire almost simultaneously from the over-threshold pulse applied to its starter anode 36, and the circuit for relay coil CR5 will be energized.

Code relay CR5, like all the CR relays, takes about 10 milliseconds to operate after its coil is energized, so at 10 ms. after start, CR5 contact 57 will transfer from its upper position (shown) to its lower position, establishing a circuit through the coil of main control relay A. Other CR5 contacts, although operated, will have no effect on their circuits because contacts of other relays are not operated. However, note that CR5 contact 58 will establish or set a dead circuit path to code magnet CM5.

Relay A has a 15 ms. built-in delay, so at 25 ms. from start, the A relay will operate, closing A contact 59. This energizes start magnet SM, to clutch the cam shaft of the punch and start a punch cycle. This also energizes code magnet CM5 through the previously closed CR5 contact 58. The punch will then start to cycle to punch code hole #5, representing the letter "T" in the five-hole code. Note that no "Letters Shift" code is needed at the start because the "home" position of all tape readers is arbitrarily assumed to be "Letters Shift" if no contrary signal has appeared.

As the punch starts to cycle, the cam S1 will open its switch contact 60 after 15 ms., or at 40 ms. from start by the key operation. This immediately cuts off power to code magnet CM5 and start magnet SM, but the punch continues in its cycle as explained earlier.

Cam S2A, at the same time as cam S1, operates to open its contact 61, thereby deenergizing the coil circuit 62 of all the code relays including CR5, and in about 5 ms., or at 45 ms. from start, CR5 will release and triode 35 will cease firing. The apparatus is now ready to receive a new key-coded punching instruction, less than 1/20 of a second after the first one, even though the punch has not yet finished its cycle. This means that an operator would have to sustain an average rate for several key operations of better than 20 per second before the machine would fail to function properly. The ordinary typewriter will not function that rapidly, nor can this rate of speed be maintained even by a highly competent speed typist.

Although the keyboard-operated parts of the apparatus are now free to be actuated again, the punch continues its cycle, until at 55 ms. from start, cam S2A again closes the switch 61 in relay power supply branch 62 from supply line 24 to the CR coil circuits, while cam S3B moves contact 63 and opens the self holding circuit of the A relay through its contact 64, which was closed at 25 ms. when the relay was operated, and which held this relay operated even when the CR5 contact 57 was opened. The A relay takes another 5 ms. to release, so at 60 ms. from start, the A contacts 59 and 64 open.

At 70 ms. from start, cam S1 restores contact 60 to closed condition and cam S3B restores contact 63 to closed condition, ready for the start of another punch cycle. At about 75 ms. from start, the punch stops, there being no continued signal on the start magnet SM to recycle the punch, with the A relay contact 59 and all CR contacts being open.

*A figure following a letter.*—With the apparatus in the condition just described, assume that a key calling for a "Figure" is depressed, for example, the key representing the number "4." Because this did not require a case shift on the typewriter, the CS contacts will be in their normal or upper position and input line 21 will produce a pulse from capacitor 23 over the matrix to connecting neon tubes 26 on the XF and on the 2 and 4 output lines, leading to triodes 30, 32 and 34. These triodes will become conducting and at 10 ms. from start, relays F, CR2 and CR4 will operate, as seen from section (*b*) of Figure 5.

Relay F will transfer its contact 65 to downward position (in the S coil circuit) and will close contacts 66 and 67 in branches of the PC coil circuit. CR2 contacts 68 and 69 and CR4 contacts 70 and 71 will close in the S coil circuit, so that the S shift relay coil will be energized to operate at 17 ms. from line 25 through unoperated CR1 contact 72, CR3 contact 73, and CR5 contact 57, unoperated A contact 74, operated CR2 contact 69 and CR4 contact 71, operated F contact 65, unoperated PC contact 75, operated CR2 contact 68 and CR4 contact 70, through coil S, to power supply 24.

When the shift relay S operates, its most important function is to set up the proper "Shift" code punching in the punch. This is done when the S relay contact 76 transfers from its upward to its downward position. The F relay has previously transferred its contact 77 to a "dead" or downward position, preventing any circuit through the code magnet CM3. Transfer of the S contact 76 conditions or sets the circuits through code magnets CM1, CM2, CM4, and CM5 so that when the A relay operates contact 59 later the "Figures Shift" code (1, 2, 4, 5) will be set in the punch.

At 25 ms. from start, the delayed operation of relay A takes place, following by 15 ms. the closing of contacts 78 and 79 by code relays CR2 and CR4 respectively. As the A contact 59 closes, it sends a signal to the start magnet SM and code magents CM1, CM2, CM4 and CM5 in the punch, to set the "Figures Shift" code and start a punch cycle.

At 40 ms. from start, cam switch 60 of cam S1 is opened, breaking the setting circuits through the SM and CM punch magnets. At the same time, cam S2B transfers its contact 80 from downward position to upward position, closing the PC relay coil circuit. This circuit goes from relay power line 24, through the PC coil, through the lower (operated) position of S contact 81, through the operated F contact 66, through cam S2B contact 80, and through unoperated contacts 72, 73 and 57 of code relays CR1, 3 and 5 to the grounded negative 25.

At about 45 to 50 ms. from start, allowing for delay following energizing of its coil, the PC relay operates. This transfers PC contact 75 in the S coil circuit to its lower position, but the S coil remains energized during the transfer because the A contact 74 and the S contact 82 in this circuit are in operated positions, and the crossover at F65 and PC75 is bypassed by a line 83. Contacts of CR2 and CR4 relays are still operated; CR1, CR3 and CR5, unoperated.

The conditions of the CR relays and their associated triodes remain as originally set by the keyboard through the matrix even though cam switch S2A has opened its contact 61 at 40 ms. Because shift relay S is operated during this time, the S contact 84 is closed in the code relay CR circuits, and has held the original setting of the CR coils and triodes.

When the PC relay operated, it closed its contacts 85 and 86 in its own coil circuit, with no immediate effect excepting to establish an added holding line through PC contact 86 and F contact 87.

The cam S2A also controls a contact 87 in the F and S coil circuits, but when this is opened at 40 ms. after start, the previous operation of S relay contact 88 to its upper position has bypassed the influence of switch 87 and has put the F and S coils under control of the later operating S3A cam switch 89.

At 55 ms. from start, the S2A and S2B cams return their switches to starting positions. PC coil is still energized through F contact 67 and PC contact 86. The CR coils remain set and the contact 61 again restores connection of the set code relays through line 62 to power source 24, paralleling the S contact 84 connection. However, at this same time, the late-operating cams S3A and S3B are actuated. S3A opens contact 89 in the F and S coil circuits, so that at 60 ms. from start, the contacts of these relays are released or restored to non-operated positions. S contact 76 and F contact 77 release the "Figures Shift" setting on the code magnets CM and restore the code magnets to control of the operated contacts 91 and 92 of code relays CR2 and CR4 respectively.

With the S contact 81 again in its upper position, the PC coil circuit now has a holding path through the coil, S contact 81, operated PC contact 85, and any one or more unoperated CR contacts leading to ground 25. The release of F contacts 66 and 67 simply takes these branches of the PC coil circuit out of operation.

Now, at 55 ms. when the S3B cam switch 63 might otherwise break the A relay coil circuit, the A relay is held on, because contacts 78 and 79 of CR2 and CR4 relays are still in downward position because these relays are maintained in their operated condition. Therefore, at 70 ms., when cam S1 again closes contact 60, the punch start magnet SM and the code relay conditioned code magnets CM2 and CM4 will be energized, and at 75 ms. the punch will continue to a second cycle to punch code holes #2 and #4, corresponding to the code for key-set numeral "4," following the "Figures Shift" punching made in the first cycle.

In the second cycle of the punch, cam S1 will open contact 60 at 90 ms. from start, wiping out the SM and CM settings, and cam S2A will open contact 61, to release the code relay coils CR2 and CR4 and interrupt firing of triodes 32 and 34 at 95 ms. A new keying can take place following this, at an interval of slightly less than $\frac{1}{10}$ of a second from the first keying. Although this appears to run close to the speed of key operation by a highly trained typist, the psychological delay which normally accompanies a switch from letters to figures or punctuation, or vice versa, will work in favor of the apparatus, and it has been found that no conflict in fact will take place in ordinary typing. If a deliberate attempt is made to "beat" the machine in a typing sequence involving a "shift" punching, it may occasionally be done with a punch continuously operating at 20 characters per second, but this is unusual. Other punches having a running rate of 30 per second can be used without possibility of malfunction even during a "shift" operation.

The punch will continue in its second cycle, with cam S3B operating at 105 ms. to release relay A at 110 ms. and cams S1, S3A and S3B restoring their switches to starting position at 120 ms., the punch stopping at 125 ms. from the original keyed start, ready for another punch cycle which may have been keyed before this.

Even after the punch stops, the PC relay is kept energized, through unoperated S contact 81, operated PC contact 85, and the unoperated contacts 72, 78, 73, 79 and 57 of code relays CR1 through CR5, to indicate that the previous character was in "Figure Shift." PC will remain operated until the S relay again operates or all five CR relays are operated in some subsequent cycle.

*A figure, following a figure.*—The PC relay will be in operated condition, as explained above, and as indicated in section (*a*) of the chart of Figure 5 of the drawings. It is assumed, for example, that the same key is struck this time as in the immediately preceding example, but the typewriter has first been case-shifted by depressing one of the case-shift keys, so that the dollar sign is being typed. As the case-shift key is depressed, the key lever or linkage will close the case-shift relay coil switch 17 and the case-shift coil CS will be energized, moving all of the CS relay contacts to their operated or lower positions. Thereafter, and while the CS relay is operated, the key switch KBS is closed by operation of the proper character key to type the dollar sign ($), and the input line 21 will be energized to cause the capacitor 23 to pulse neon tubes connected to the output lines XF, 1 and 4. This starts triodes 30, 31 and 34, and operates relays F, CR1 and CR4 after their normal operating delay of 10 ms.

The S relay will not be operated, because its coil circuit will be open at the cross-over, with PC contact 75 in its operated or lower position and F contact 65 also in its operated or lower position. F contact 67 will be closed, establishing an additional PC coil holding circuit in the early part of the cycle.

At 25 ms., when the A relay is operated from the closed CR1 and CR4 contacts at 72 and 79, the closing A contact 59 will energize the starting magnet SM to start the punch, and the code magnets CM1 and CM4, whose circuits were set by the operated CR1 contact 93 and CR4 contact 92 when these code relays were energized from the triodes 31 and 34.

At 40 ms., cam switch S1 opens contact 60, breaking the circuits to SM, CM1 and CM4, but the punch will continue through its cycle to punch code holes #1 and #4, representing the dollar sign in the "Figures Shift" meaning of the code.

At 40 ms. the S2A cam will open contact 61 to wipe out the setting of code relays CR1 and CR4, and cause triodes 31 and 34 to cease firing. Cam S2B transfers contact 80 to its upper position, but PC remains operated through unoperated S contact 81 and operated PC contact 85. However, cam S2A will open contact 87, breaking the power to the F relay coil, because unoperated S contact 88 has put the early cam S2A rather than the later cam S3A in control.

Normal delays determine that the F relay, the CR relays and the triodes will all be fully released or cut out at 45 ms. from start.

At 55 ms. from start, cam S3B opens contact 63, de-energizing the A relay coil circuit, there being no still-operated CR contacts to hold this relay "on," and following normal delay at 60 ms. the A relay contacts release.

The punch cycle continues through the cam switch restoration at 70 ms. of switches 60 by S1, 89 by S3A, and 63 by S3B, and the punch cam shaft stops at 75 ms. with PC still operated.

*A letter following a figure.*—In section (*b*) of Figure 6 of the drawings, the PC relay is indicated as operated at the beginning, as explained in the operation immediately before this one. Assume that the "T" key is struck as before, and the matrix will cause output 5 and triode 35 to be energized, actuating code relay CR5 at 10 ms.

The F relay has not been energized because no signal came over line XF to fire triode 30. However, the S relay sets up a shift code punching because S operates at 17 ms., the circuit going from power line 24, through coil S, through operated CR5 contact 94 and unoperated CR3 contact 95, operated PC contact 75, unoperated F contact 65, operated CR5 contact 96, unoperated A contact 74, unoperated contacts 72, 78, 73 and 79 of CR1, 2, 3 and 4, to ground wire 25.

When S relay operates it transfers S contact 76 to its lower position and sets up a direct connection through all five code magnets CM1 through CM5, contact F77 being in upper or closed position because F is not operated.

Thereafter, when the A relay delay-operates at 25 ms., from closed CR5 contact 57, all code magnets will be set and the punch started to punch all five hole positions, denoting a "Letters Shift" condition.

At 40 ms., as the punch cycles, the cam S1 opens switch 60 to wipe out the CM "shift" code settings and the SM signal, and cam S2B opens the PC coil circuit at contact 80. PC cannot be held in through its contact 85 because S contact 81 was broken when S operated. It cannot hold through the lower position of S contact 81 because the F relay has not operated contact 66. It cannot hold through PC contact 86 because F contact 67 is open. At 45 to 50 ms. the PC relay will therefore be released following operation of cam switch S2B contact 80.

Operated S contact 84 holds in CR5 when cam S2A contact 61 opens. Cam S2A contact 87 has no effect on the S coil circuit beecause S contact 88 is in upper or operated position. As the punch continues to cycle, cam S3A operates at 55 ms. to open contact 89, and this breaks the S coil circuit, the S relay releasing at 60 ms.

The A relay continues to be energized after operation of S3B cam switch 63 because CR5 contact 57 is still closed. Therefore, when S1 cam switch 60 is closed again at 70 ms., the SM and CM5 magnets are again energized to start another punch cycle and punch code hole #5 for the letter "T." The A contact 59 is closed because A relay is still operated. S contact 76 is in upper or released position, cutting out the "shift" setting, and CR5 contact 58 is closed because of the continued operation of code relay CR5 and triode 35.

The second punch cycle will proceed, cutting out the SM and CM5 settings at 90 ms. from cam S1; dropping out the CR5 and triode 35 settings at 95 ms. following cam S2A operation at 90 ms.; and releasing the A relay at 110 ms. after cam S3B operation at 105 ms. Cams S1, S3A and S3B restore at 120 ms. and the punch halts at 125 ms. Relay PC is not left operated, indicating that the previous character was in "Letters Shift" and not in "Figures Shift."

*"Delete" code.*—It is good practice always to strike the "Delete" key when starting to use the apparatus, because this "homes" the machine in "Letters Shift" condition even though a previous use of the machine may have left it in "Figures Shift," unknown to the operator.

If the "Delete" key is struck when the machine is already in "Letters Shift" condition, a regular single punch cycle of the "Letter Following a Letter" type takes place, punching all five code hole positions in the tape, corresponding to neon tube connections to matrix output lines 1, 2, 3, 4 and 5, pulsed through closing of the "Delete" KBS switch and action of the capacitor in its input line.

However, if the "Delete" key is struck when the machine is in "Figures Shift" condition, the PC relay is in its operated position before the key is depressed. Therefore, when KBS switch on the "Delete" input 20 is closed, the neon tubes connected to matrix outputs 1, 2, 3, 4 and 5 are fired, the five triodes 31, 32, 33, 34 and 35 are fired, and code relays CR1 through CR5 are all operated. As seen in section (*c*) of Figure 5, the operation of all five CR relays at 10 ms. is followed by release of the PC relay at 15 ms. because the PC coil circuit is opened at all CR contacts 72, 78, 73, 79 and 57, leading to ground. Thereafter the machine proceeds to punch all five code holes without any double cycle "shift" punching, since PC is off, and S and F will not be operated. "Letters Shift" condition is indicated because PC is off at the end of the punch cycle.

*"Space" punching, without shifting.*—When the space bar of the typewriter is depressed, a Space KBS switch is closed, pulsing a single neon tube connected to matrix output line #3. This starts triode 33, and operates CR3 relay at 10 ms. If the machine is in "Letters Shift," with PC not operated, a regular single punching cycle follows, setting up and punching the code hole #3, representing Space in the code. However, if PC is operated when this KBS switch starts its chain of actions, CR3 contact 97 will establish a circuit to code magnet CM3 but S relay coil will not be energized, because the CR3 contact 95 in the S coil circuit is reverse-acting, to be open when CR3 is energized, while the other contacts in this bank of CR contacts are all open when their relays are not energized.

PC remains in, however, because of unoperated CR contacts 72, 78, 79 and 57, and because S contact 81 remains unoperated. Therefore, the punch proceeds to punch the Space code without a shift signal or punching, and the apparatus remains in its previous shift condition, "Figures Shift."

Another way of accomplishing this "shiftless" punching of the Space code, which may be applied to other codes such as those for Carriage Return or Tabulation, is shown in Figure 7 of the drawings. As seen here, the matrix input line 20 of each of the desired "shiftless" code key switches is connected directly by neon tubes 26 to the desired matrix output line or lines 1 through 5, and each input line is further connected by a neon tube 99 to the XF output line but through a PC relay-operated contact 100 which is open when PC is not operated and is closed when PC is operated.

With this arrangement, every time one of the selected KBS keys is operated, its coded shift condition is determined by the state of the PC relay, which reflects the previous character shift condition. That is, if one of these codes is used after a "Figure," it becomes a "Figure" too, by operation of the F relay through the XF matrix output from a closed PC contact 100 and tube 99; but if the same code is used after a "Letter," is becomes a "Letter," there being no closed PC contact to send a signal over the XF line.

Of course, when this alternative "shiftless" coding arrangement is used, the code relay contact bank including the reverse-acting CR3 contact 95 is eliminated from the circuit.

*Review*

It will be seen that a four-bank keyboard typewriter is equipped to actuate a five-hole code punch from normal operation of the typewriter keys and controls while typing a legible record. "Shift" punchings are produced rapidly and automatically when required by the code, and the operator need not set them with a key. A typist with ordinary training may use the machine. If no punching is desired, the punch unit may simply be disconnected and the typewriter used in normal fashion. If punching alone is desired, the typewriter type bar actions may be disabled or disconnected by known means, and if the KBS switches are operated from the key levers or similar mechanism which is not disabled or disconnected, key operations will result in punching without typing.

The punch speed is such that it will take care of high speed typing signals, and repeat coding is prevented by the quick setting, single impulse coding devices, including the matrix with its threshold response neon tubes, fired by the pulse forming capacitors, and the pulse settable triodes.

As will be evident from the foregoing, certain aspects of the invention are not limited to the particular details set forth as an example, and it is contemplated that various and other modifications and applications of the invention will occur to those skilled in the art. It is therefore intended that the appended claims shall cover such modifications and applications as do not depart from the true spirit and scope of the invention.

What is claimed as new and is desired to be secured by Letters Patent of the United States is:

1. In a code recording apparatus actuated from a keyboard having a greater number of keys than the available different combinations in the code, requiring prior recording of a shift signal code to determine the meaning of certain following code combinations, said apparatus including a previous shift condition indicator, encoding devices producing a code position combination and a present shift condition indication from each key operation, said encoding devices comprising a matrix with a coded arrangement of connections between inputs from each key and outputs to the code positions and present shift condition indication, each of said connections being a resistance with non-linear, symmetrical but discontinuous characteristics, a code recorder having code position indicators normally set from said code position combination of said encoding devices, a recorder control for starting said recorder, a shift transfer for setting said previous shift condition indicator to retain the present shift condition indication for a subsequent recording operation, and a shift signal recording control including a shift signal setting device operating when said previous and present shift condition indicators disagree to set a shift signal in the code position indicators of said code recorder before setting of the keyed code position combination.

2. In a code recording apparatus actuated from the keys of a typewriter having a number of separate keys greater than the number of individual signal combinations in the code and requiring recording of one of two shift condition signal combinations to determine the significance of following code combinations, said apparatus comprising a control having a previous shift condition signal memory, encoding devices producing a basic coded signal combination and a present shift condition signal in said control from each typewriter key operation, a coded record producing mechanism having recording elements normally set from said basic coded signal of said encoding devices, a recording control delay-actuated from said basic signal for starting said record mechanism, and continuing to operate said record mechanism as long as said basic signal is retained in said control and stopping said mechanism only after said mechanism has recorded said basic signal combination, means controlled by operation of said record mechanism for transferring said present shift condition signal to said previous shift memory, and a shift code actuator jointly controlled by the present shift and previous shift condition signals for recording a shift signal before a basic coded signal when required.

3. In a code recording apparatus actuated from the keys of a typewriter having a number of separate keys greater than the number of individual signal combinations in the code and requiring recording of one of two shift condition signal combinations to determine the significance of following code combinations, said apparatus comprising a control having a previous shift condition signal memory, encoding devices producing a basic coded signal combination and a present shift condition signal in said control from each typewriter key operation, a coded record producing mechanism having recording elements normally set from said basic coded signal of said encoding devices, a recording control delay-actuated from said basic signal for starting said record mechanism, and continuing to operate said record mechanism as long as said basic signal is retained in said control and stopping said mechanism only after said mechanism has recorded said basic signal combination, means controlled by operation of said record mechanism for transferring said present shift condition signal to said previous shift memory, and an arrangement for automatically recording a shift condition signal before a basic coded signal when required, including a shift code actuator jointly controlled by the present shift and previous shift condition signals, operative when said present and previous shift signals disagree, to retain said basic coded signal, withhold it from said record mechanism and superimpose one of said shift condition signal combinations as the setting for said recording elements thereof before said recording control starts said record producing mechanism, said record producing mechanism thereafter continuing to operate, recording the set shift signal combination and finally setting and recording said retained basic coded signal combination.

4. In a code recording apparatus actuated from the keys of a typewriter having a number of separate keys greater than the number of individual signal combinations in the code and requiring recording of one of two shift condition signal combinations to determine the significance of following code combinations, said apparatus comprising switches controlled by the keys, a control having a previous shift condition signal memory, encoding devices producing a basic coded signal combination and a present shift condition signal in said control from each typewriter key switch operation, information storage devices for said basic and shift signals, a coded record producing mechanism having recording elements normally set from said basic coded signal in said information storage devices, a recording control delay-actuated from said basic signal for starting said record mechanism, and continuing to operate said record mechanism as long as said basic signal is retained in said control and stopping said mechanism only after said mechanism has recorded said basic signal combination, means transferring said present shift condition signal from said information storage devices to said previous shift memory, and means for recording a shift condition signal before a basic coded signal when said present and previous shift signals disagree before transfer, said shift recording means acting to retain said basic coded signal in the information storage, and, jointly with said present shift condition signal, superimpose one of said shift condition signal combinations as the setting for said recording elements thereof before said recording control starts said record producing mechanism, said record producing mechanism thereafter continuing to operate, recording the set shift signal combination and finally setting and recording said retained basic coded signal combination.

5. In a code recording apparatus actuated from the keys of a typewriter having a number of separate keys greater than the number of individual signal combinations in the code and requiring recording of one of two shift condition signal combinations to determine the significance of following code combinations, said apparatus comprising pulse forming devices operated by the keys, a control having a previous shift condition signal memory, encoding devices producing a basic coded signal combination and a present shift condition signal in said control from the pulses formed by each typewriter key operation, said encoding devices comprising a matrix with a coded arrangement of connections between inputs from the pulse forming devices and outputs to pulse settable information storage devices for the code position combinations and present shift indication, each matrix connection being a resistance with non-linear, symmetrical but discontinuous characteristics, a coded record producing mechanism having recording elements normally set from said basic coded signal of said information storage devices, a recording control delay-actuated from said basic signal for starting said record mechanism, and continuing to operate said record mechanism as long as said basic signal is retained in said storage devices and stopping said mechanism only after said mechanism has recorded said basic signal combination, means controlled by operation of said record mechanism for transferring said present shift condition signal to said previous shift memory, and means for recording a shift condition signal before a basic coded signal when said present and previous shift signals disagree, said record producing mechanism thereafter operating to record the set shift signal combination and finally set and record said basic coded signal combination.

6. In a typewriter-operated code punching apparatus wherein there are more typewriter keys than there are available code combinations, requiring the punching of a shift code to determine the meaning of succeeding code combinations, said apparatus comprising a typewriter with a standard four-bank keyboard, a code punch with punching elements for a five-position code, and a control unit between the typewriter and the punch, said control unit having a previous shift condition memory, an encoding matrix producing a basic coded signal combination and a present shift condition signal from each typewriter key operation, said basic signal normally selecting and setting corresponding punching elements in the punch for operation when the punch is started and the previous and present shift conditions agree, a punch control delay-actuated from said basic signal for starting the punch to operate until the punching elements have punched the selected basic signal combination, a transfer device for setting said previous shift condition memory to retain the present shift condition signal for a subsequent punch operation, said control unit having means for automatically causing punching of a shift code before a basic coded signal combination when required, said automatic punching means including a shift code setting device jointly controlled by said present shift condition signal and said previous shift condition memory to operate when said present and previous conditions disagree, said operated shift setting device thereupon retaining said basic coded signal combination in said control unit, withholding it from said punching elements, selecting a shift code and setting said shift code on corresponding punching elements in the punch before said punch control starts the punch, said punch operating thereafter to punch the shift code and then the selected basic coded signal combination.

7. In a typewriter-operated code punching apparatus wherein there are more typewriter keys than there are available code combinations, requiring the punching of a shift code to determine the meaning of succeeding code combinations, said apparatus comprising a typewriter with a standard four-bank keyboard, a code punch with punching elements for a five-position code, and a control unit between the typewriter and the punch, said control unit having a relay acting as a previous shift condition memory, an encoding matrix setting relays in a basic coded signal combination and setting a present shift condition relay from each typewriter key operation, said basic signal relay setting normally selecting and setting corresponding punching elements in the punch for operation when the punch is started and the previous shift and present shift relay conditions agree, a punch control relay delay-actuated from said basic signal relays for starting the punch and permitting the punch to operate as long as said basic signal relay setting is retained in said control unit but stopping said punch only after the punching elements have operated to punch the selected basic signal relay combination, a transfer switch controlled by operation of the punch for setting said previous shift condition relay to retain the present shift relay condition for a subsequent punch operation, said control unit having means for automatically causing punching of a shift code before a basic coded signal combination when required, said automatic punching means including a shift code setting relay jointly controlled by said present shift condition relay and said previous shift condition relay to operate when said present shift and previous shift relay conditions disagree, said operated shift setting relay thereupon retaining said basic coded relay combination in said control unit, withholding it from said punching elements, selecting a shift code depending upon the present shift relay condition and setting said shift code on corresponding punching elements in the punch before said punch control relay starts the punch, said punch operating thereafter to punch the shift code and then the selected basic coded relay combination.

8. A typewriter and a code recording apparatus controlled thereby, comprising in combination, a limited number of combinationally operable elements to effect recordings, typewriter keys falling into two groups of which individual keys of one group are related to individual keys in the other group, means responsive to either key of each related pair to set up identical combinational selecting conditions for said elements, the various keys in each group setting up different ones of such combinational selecting conditions, means controlled by said keys to denote in reference to each key operation whether an operated key is of said one or other group, said responsive means comprising a switch operable by each key, a matrix having individual input lines leading from the switches, a pulse forming device in each input line, output lines from the matrix corresponding in number to said elements, resistance devices between each input line and one or more of said output lines in a differentiating, coded arrangement and having each a non-linear, discontinuous characteristic, a signal device at each output line adapted to be triggered into a current-delivering state by the resistance devices related thereto, each triggered signal device setting up a different combinational selecting condition for said elements, memory means governed by said denoting means to signify in reference to each currently operated key whether or not the precedingly operated key was of the same group, means controlled partially by said denoting means and partially by said memory means, to produce one distinguishing set of selecting circuits for said elements if the currently operated key is of said one group and follows an operation of a key of said other group, and to produce another set of distinguishing selecting circuits for said elements if the currently operated key is of said other group and follows an operation of a key of said one group, means to make said elements promptly responsive to said set up selecting conditions therefor if neither of said sets of said selecting circuits is produced, and if a distinguishing set of selecting circuits is produced to make said elements first responsive to such circuits and thereafter to said set up selecting conditions, and means to terminate automatically the current delivering state of the signal devices promptly after the elements become responsive thereto thereby releasing also the set up selecting conditions.

9. The invention set forth in claim 8, the resistance elements comprising two-elements gas tubes, and the signal devices comprising gas tubes of at least three elements.

10. A typewriter and a code recording apparatus controlled thereby, comprising in combination, a limited number of combinationally operable elements to effect recordings, typewriter keys falling into two groups of which individual keys of one group are related to individual keys in the other group, means responsive to either key of each related pair to set up identical combinational selecting conditions for said elements, the various keys in each group setting up different ones of such combinational selecting conditions, means controlled by said keys to denote in reference to each key operation whether an operated key is of said one or other group, said responsive means comprising a switch operable by each key, a matrix having individual input lines leading thereinto, a case-shift key additional to said first keys, means controlled by said first keys and said case-shift key whereby in one case position of the latter the individual first keys, when operated, will activate each a specific input line and whereby when said case-shift key is in another case position and the same individual first keys are operated there will be activated an alternate input line, a pulse forming device in each input line, output lines from the matrix corresponding in number to said elements, resistance devices between each input line and one or more of said output lines in a differentiating, coded arrangement and having each a non-linear, discontinuous characteristic, a signal device at each output line adapted to be triggered into a current-delivering state by the resistance devices related thereto, each triggered signal device setting up a different combinational selecting condition for said elements, memory means governed by said denoting means to signify in reference to each currently operated key whether or not the precedingly operated key was of the same group, means controlled partially by said denoting means and partially by said memory means, to produce one distinguishing set of selecting circuits for said elements if the currently operated key is of said one group and follows an operation of a key of said other group, and to produce another set of distinguishing selecting circuits for said elements if the currently operated key is of said other group and follows an operation of a key of said one group, means to make said elements promptly responsive to said set up selecting conditions therefor if neither of said sets of said selecting circuits is produced, and if a distinguishing set of selecting circuits is produced to make said elements first responsive to such circuits and thereafter to said set up selecting conditions, and means to terminate automatically the current delivering state of the signal devices promptly after the elements become responsive thereto thereby releasing also the set up selecting conditions.

11. A typewriter and a code recording apparatus controlled thereby having combinationally operable recording elements, comprising in combination, a code position selecting relay for each recording element, typewriter keys falling into two groups of which individual keys of one group are related to individual keys in the other group, means responsive to either key of each related pair to activate the same relays, the various keys in each group causing activation of different combinations of said code relays, relay means including a relay additional to the code relays to signify in reference to each key operation whether an operated key is of said one or other group, means only responsive to the keys of said one group to activate said additional relay, said responsive means for said code relays and said additional relay comprising an individual switch operable by each key, a matrix having individual input lines leading from the switches, a pulse forming device in each input line, a number of output lines from the matrix corresponding to said relays, resistance elements between the various input lines and one or more of said output lines in a differentiating coded arrangement and having each a non-linear, discontinuous characteristic, a signal device at each output line adapted to be triggered into a current-delivering state by the resistance elements related thereto, each signal device being in a circuit with an individual one of said relays, memory means governed by said relay means to denote in reference to a currently operated key whether or not the precedingly operated key was of the same group, means controlled partially by said relay means and partially by said memory means, to produce one distinguishing set of selecting circuits for said recording elements if the currently operated key is of said one group and follows an operation of a key of said other group, and to produce another set of distinguishing selecting circuits for said recording elements if the currently operated key is of said other group and follows an operation of a key of said one group, means to make the recording elements promptly responsive to the code relays if no distinguishing set of said selecting circuits is produced, and if a distinguishing set of preselecting circuits is produced to make the recording elements first responsive to such circuits and later to said code relays, and automatic means to terminate the current delivering state of the signal devices of the code relays after the recording elements have become responsive thereto.

12. The invention set forth in claim 11, including means to terminate the current delivering state of the signal device for said additional relay closely after the recording elements have become responsive to a set of distinguishing selecting circuits.

13. A typewriter and a code recording apparatus controlled thereby, comprising in combination, a limited number of combinationally operable elements to effect recordings, typewriter keys falling into two groups of which individual keys of one group are related to individual keys in the other group, a relay, a switch operable by each key, a matrix having individual input lines leading from the switches, a pulse forming device in each input line, a number of output lines from the matrix corresponding in number to said elements, a resistance device between each input line and one or more of said output lines and having each a non-linear, but discontinuous characteristic, a signal device at each output line adapted to be triggered into a current-delivering state by the resistance device related thereto, said resistance devices arranged so that individual keys of pairs of related keys will trigger identical ones of the other signal devices, the various pairs of keys triggering different combinations of said signal devices, means controlled by the keys of one group only to energize said relay, means responsive to said relay to denote in reference to each key operation whether the operated key is of said one or other group, memory means governed by said relay to signify in reference to a currently operated key whether or not the precedingly operated key was of the same group, means controlled partially by said relay and partially by said memory means, to produce one distinguishing set of selecting circuits for said recording elements if the currently operated key is of said one group and follows an operation of a key of said other group, and to produce another set of distinguishing selecting circuits for said recording elements if the currently operated key is of said other group and follows an operation of a key of said one group, means to make the elements promptly responsive to the signal devices if no distinguishing set of said selecting circuits is produced, and if a distinguishing set of selecting circuits is produced to make them first responsive to such circuits and later to said signal devices, and means to terminate the current delivering state of said signal devices promptly after said elements have become responsive thereto.

14. A typewriter and a code recording apparatus controlled thereby, comprising in combination, typing keys which are greater in number than the available different combinations in a recording code, some typing keys falling into one group and some into another group, encoding means controlled by the individual typing keys of one group to produce different combinational code position indications and controlled by the individual typing keys of the said other group to produce variously the same different combinational code position indications, means to denote automatically in reference to each current typing key operation whether the code position indication is made by a typing key of said one or said other group, memory means controlled by successive operations of said typing keys to signify in reference to a currently operated typing key whether or not the precedingly operated typing key was one of the same group, means governed at each new typing key operation conjointly by said denoting means and the memory means to produce a special combinational code position indication if an operation of a typing key of said one group follows an operation of a typing key of said other group, and to produce another special combinational code position indication if an operation of a typing key of said one group precedes an operation of a typing key of said other group, and means to make the recording apparatus promptly responsive to said first code position indication in the absence of a production of either of said special code position indications and whereby whenever a special code position indication is produced, the recording apparatus becomes promptly responsive to such indication and delayedly to the first stated code position indication.

15. A typewriter and a code recording apparatus controlled thereby, comprising in combination, typing keys which are greater in number than the available different combinations in a recording code, some typing keys falling into one group and some into another group, encoding means controlled by the individual typing keys of one group to produce different combinational code position indications and controlled by the individual typing keys of the said other group to produce variously the same different combinational code position indications, means controlled by the operations of the typing keys of one group exclusive of the other group, to denote in reference to each current typing key operation whether the code position indication is made by a typing key of said one or said other group, memory means controlled by successive operations of said typing keys to signify in reference to a currently operated typing key whether or not the precedingly operated typing key was one of the same group, means governed at each new typing key operation conjointly by said denoting means and the memory means to produce a special combinational code position indication if an operation of a typing key of said one group follows an operation of a typing key of said other group, and to produce another special combinational code position indication if an operation of a typing key of said one group precedes an operation of a typing key of said other group, and means to make the recording apparatus promptly responsive to said first code position indication in the absence of a production of either of said special code position indications and whereby whenever a special code position indication is produced, the recording apparatus becomes promptly responsive to such indication and delayedly to the first stated code position indication.

16. A typewriter and a code recording apparatus controlled thereby having a limited number of combinationally operable recording elements, comprising in combination, typing keys falling into two groups and of which individual typing keys in one group are related individually to individual typing keys in the other group, means responsive to either typing key of each related pair to set up corresponding selecting circuits for said recording elements, the typing keys of the various pairs adapted to set up such circuits for selection of different recording elements, circuit means controlled by the typing keys of one group exclusive of the other group to denote in reference to each typing key operated whether the selecting circuits are set up by a typing key belonging to said one or said other group, memory means controlled by successive operations of the typing keys to signify at each current typing key operation whether or not the precedingly operated typing key was of the same group, means effective at each typing key operation to compare what is denoted by said circuit means and what is signified by said memory means, including means to yield one distinguishing set of code selecting circuits if the comparison indicates an operation of a typing key of said one group following an operation of a typing key of said other group, and to yield another set of distinguishing code selecting circuits if the comparison indicates an operation of a typing key of said other group following an operation of a typing key of said one group, and means whereby whenever said comparing means yields one or the other set of distinguishing selecting circuits, the recording elements become first responsive to the yielded set of distinguishing selecting circuits and then to the first set-up code selecting circuits, and whereby when said comparing means yields none of said distinguishing sets of selecting circuits, the recording elements become promptly responsive to said first set-up code selecting circuits.

17. A typewriter and a code recording apparatus controlled thereby having a limited number of combinationally operable recording elements, comprising in combination, typing keys falling into two groups and of which individual typing keys of one group are related individually to individual typing keys in the other group, individual electromagnets to which the recording elements respond for operation, a code relay related individually to each electromagnet to close its circuit, means responsive to either typing key of each related pair to close circuits for the same code relays, the various typing keys in each group closing circuits for different combinations of said code relays, an additional relay related to the typing keys of said one group only, means to close the circuit for such additional relay by the operation of only such typing keys which fall into said one group, means controlled by the operation of said additional relay to denote in reference to each typing key operation whether closure of code relays are effected by a typing key of said one or said other group, memory means governed by said additional relay to signify with reference to a currently operated typing key whether or not the precedingly operated typing key was one of the same group, means controlled partially by said additional relay and partially by said memory means, to produce one distinguishing set of operating circuits for said electromagnets if the currently operated typing key is of said one group and follows an operation of a typing key of said other group, and to produce another set of distinguishing operating circuits for said electromagnets if the currently operated typing key is of said other group and follows an operation of a typing key of said one group, and means whereby whenever said producing means yields either of said distinguishing sets of operating circuits, the electromagnets come first under its control and subsequently under the control of said code relays, and whereby whenever said producing means yields neither of said distinguishing sets of operating circuits, said electromagnets become promptly responsive to said code relays.

18. The combination of a typewriter and a code recording apparatus controllable thereby comprising in combination, relatively many typewriter keys in relation to a limited number of available different combinations in a recording code, some of said keys falling into one group and some falling into another group, the typewriter having a case-shift means controllable to occupy a lower or an upper case position, encoding means responsive to individual keys of said one group to produce code position indications which for all keys and in both case positions of said case-shift means are distinctive, and responsive to the keys of said other group to produce code position indications which are identical to those produceable by the keys of said one group in one position of said case-shift means, means to denote in reference to each current key operation whether the code position indication is made by a key of said one or other group, memory means controlled by successive operations of said keys to signify in reference to a currently operated key whether or not the precedingly operated key was one of the same group, means governed at each new key operation conjointly by said denoting and the memory means to produce a special combinational code position indication if an operation of a key of said one group follows an operation of a key of said other group, and to produce another special combinational code position indication if an operation of a key of said one group precedes an operation of a key of said other group, a series of combinationally operable elements, and means whereby said elements become promptly responsive to said first code position indication in the absence of a production of either of said special code position indications and whereby whenever a special code position indication is produced, the said elements become promptly responsive first to such special indication and then to the first stated code position indication.

19. In a code recording apparatus actuated from a keyboard having a greater number of keys than the available different combinations in the code, requiring prior recording of a shift signal code to determine the meaning of certain following code combinations, said apparatus including a previous shift condition indicator, encoding devices producing a code position combination and a present shift condition indication from each key operation, a code recorder having code position indicators normally set from said code position combination of said encoding devices, a recorder control for starting said recorder, a shift transfer for setting said previous shift condition indicator to retain the present shift condition indication for a subsequent recording operation, the said encoding devices in said apparatus comprising a grid with input lines from the keys, output lines to the code positions and present shift condition indication, and resistance elements connected between each input line and one or more of the output lines in a coded arrangement by which each input line is represented by a connected combination of one or more output lines different from the connected combination representative of any other input line, said resistance elements each having non-linear, symmetrical but discontinuous characteristics.

References Cited in the file of this patent

UNITED STATES PATENTS

| | | |
|---|---|---|
| 2,346,268 | Mills et al. | Apr. 11, 1944 |
| 2,372,887 | Doty | Apr. 3, 1945 |
| 2,537,427 | Seid et al. | Jan. 9, 1951 |
| 2,693,593 | Grosman | Nov. 2, 1954 |